(12) United States Patent
Flynn et al.

(10) Patent No.: US 8,261,560 B2
(45) Date of Patent: Sep. 11, 2012

(54) METHODS OF USING HYDROFLUOROETHERS AS HEAT TRANSFER FLUIDS

(75) Inventors: Richard M. Flynn, Mahtomedi, MN (US); Michael G. Costello, Afton, MN (US); Michael J. Bulinski, Houlton, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 537 days.

(21) Appl. No.: 12/610,765

(22) Filed: Nov. 2, 2009

(65) Prior Publication Data
US 2011/0100601 A1    May 5, 2011

(51) Int. Cl.
C09K 5/04 (2006.01)
(52) U.S. Cl. ..................... 62/114; 165/104.19
(58) Field of Classification Search ............. 62/114, 62/502; 252/67; 165/104.19
See application file for complete search history.

(56) References Cited

U.S. PATENT DOCUMENTS

| | | | |
|---|---|---|---|
| 3,962,348 A | 6/1976 | Benninger et al. | |
| 5,713,211 A | 2/1998 | Sherwood | |
| 5,962,390 A | 10/1999 | Flynn et al. | |
| 6,953,082 B2 | 10/2005 | Costello et al. | |
| 7,128,133 B2 | 10/2006 | Costello et al. | |
| 7,390,427 B2 | 6/2008 | Costello et al. | |
| 7,691,282 B2 | 4/2010 | Flynn et al. | |
| 2003/0039919 A1 | 2/2003 | Bradley et al. | |
| 2007/0267464 A1 | 11/2007 | Vitcak et al. | |
| 2008/0139683 A1 | 6/2008 | Flynn et al. | |
| 2008/0245509 A1* | 10/2008 | Costello et al. | 165/104.19 |
| 2009/0183856 A1 | 7/2009 | Bulinski et al. | |
| 2010/0108934 A1 | 5/2010 | Flynn et al. | |
| 2010/0263885 A1 | 10/2010 | Tuma | |
| 2011/0257073 A1* | 10/2011 | Flynn et al. | 510/499 |

FOREIGN PATENT DOCUMENTS
RU     2312097    12/2007

OTHER PUBLICATIONS

Abe, "Electrochemical Fluorination (Simons Process) as a Route to Perfluorinated Organic Compounds of Industrial Interest", *Prep. Prop. Indust. Appl. Organofluorine Comp.*, pp. 19-43, (1982).
Fokin, "Reaction of Polyfluorinated Alcohols with Fluoroolefins", *Russian Chemical Bulletin*, vol. 26, No. 9, pp. 1983-1988. [Translated from Izvestiya Akademii Nauk SSSR, *Seriya Khimicheskaya*, No. 9, pp. 2141-2146, (Sep. 1977)].
Il'in, "Promising Prospects for Using Partially Fluorinated Alcohols as O-Nucleophilic Reagents in Organofluoric Synthesis", *Russian Journal of Applied Chemistry*, vol. 80, No. 3, pp. 405-418, (2007).
Johncock, "Sulphur-Oxygen Versus Carbon-Oxygen Scission in Trifluoromethanesulphonates", *Journal of Fluorine Chemistry*, vol. 4, pp. 25-33, (1974).
Marchionni, "The Comparison of Thermal Stability of Some Hydrofluoroethers and Hydrofluoropolyethers", *Journal of Fluorine Chemistry*, vol. 125, pp. 1081-1086, (2004).
Rakhimov, "Synthesis of Di(polyfluoroalkyl) Ethers", *Russian Journal of Applied Chemistry*, vol. 77, No. 9, pp. 1561-1563, (2004). [Translation from *Zhurnal Prikladnoi Khimii*, vol. 77, No. 9, pp. 1573-1574, (2004)].
Yakata, "Influence of Dispersants on Bioconcentration Factors of Seven Organic Compounds With Different Lipophilicities and Structures", *Chemosphere*, vol. 64, pp. 1885-1891, (2006).

* cited by examiner

*Primary Examiner* — Melvin Jones
(74) *Attorney, Agent, or Firm* — Stephen F. Wolf

(57) ABSTRACT

An apparatus is provided that includes a device and a mechanism for heat transfer. The mechanism includes a hydrofluoroether heat-transfer fluid wherein the heat transfer fluid is represented by the following structure:

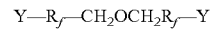

$$Y-R_f-CH_2OCH_2R_f-Y$$

wherein $R_f$ may be the same or different and is, independently, selected from the group consisting of perfluorinated alkylene groups which may be linear, cyclic, or branched having from 1 to 10 carbon atoms, partially fluorinated alkylene groups having from 1 to 10 carbon atoms, and derivatives thereof wherein one or more carbon atoms are replaced by catenated nitrogen or oxygen heteroatoms, wherein each $R_f$ contains at most one hydrogen atom, wherein Y represents H, F, or an $R_fCH_2OCH_2-$ group, and wherein the total number of carbon atoms in the molecule is at least 6. A method of transferring heat including the device and the provided heat-transfer fluid is also provided

16 Claims, No Drawings

METHODS OF USING HYDROFLUOROETHERS AS HEAT TRANSFER FLUIDS

FIELD

This disclosure relates to apparatuses and methods that include hydrofluoroethers as a heat-transfer fluid.

BACKGROUND

Presently various fluids are used for heat transfer. The suitability of the heat-transfer fluid depends upon the application process. For example, some electronic applications require a heat-transfer fluid which is inert, has a high dielectric strength, has low toxicity, good environmental properties, and good heat transfer properties over a wide temperature range. Other applications require precise temperature control and thus the heat-transfer fluid is required to be a single phase over the entire process temperature range and the heat-transfer fluid properties are required to be predictable, i.e., the composition remains relatively constant so that the viscosity, boiling point, etc. can be predicted so that a precise temperature can be maintained and so that the equipment can be appropriately designed.

Perfluorocarbons, perfluoropolyethers, and some hydrofluoroethers have been used for heat-transfer. Perfluorocarbons (PFCs) can have high dielectric strength and high resistivity. PFCs can be non-flammable and are generally mechanically compatible with materials of construction, exhibiting limited solvency. Additionally, PFCs generally exhibit low toxicity and good operator friendliness. PFCs can be manufactured in such a way as to yield a product that has a narrow molecular weight distribution. They can exhibit one important disadvantage, however, and that is long environmental persistence.

Perfluoropolyethers (PFPEs) exhibit many of the same advantageous attributes described for PFCs. They also have the same major disadvantage, i.e., long environmental persistence. In addition, the methods developed for manufacturing these materials can yield products that are not of consistent molecular weight and thus can be subject to performance variability.

Hydrofluoropolyethers (HFPEs), a class of hydrofluoroethers (HFEs), can exhibit some of the same advantageous attributes of PFCs, but differ greatly in two areas. To their credit, they can exhibit markedly lower environmental persistence, yielding atmospheric lifetimes on the order of decades rather than millennia. However, some of the HFPEs taught as heat-transfer fluids can be a mixture of components of widely disparate molecular weight. Thus, their physical properties may change over time which makes it difficult to predict performance.

SUMMARY

Some hydrofluoroethers have been disclosed as heat-transfer fluids. However, the need exists for heat-transfer fluids that are inert, have high dielectric strength, low electrical conductivity, chemical inertness, thermal stability and effective heat transfer, are liquid over a wide temperature range, have good heat-transfer properties over a wide range of temperatures and also have an acceptable environmental profile including a relatively short atmospheric lifetime and relatively low global warming potential. The need also exists for an apparatus requiring a device and a mechanism for transferring heat to or from the device using a heat-transfer fluid having these properties.

In one aspect, an apparatus requiring heat transfer is provided that includes a device and a mechanism for transferring heat to or from the device wherein the mechanism comprises using a heat-transfer fluid wherein the heat transfer fluid comprises a compound that is represented by the following structure:

Y—$R_f$—$CH_2OCH_2R_f$—Y wherein each $R_f$ may be the same or different and is, independently, selected from the group consisting of perfluorinated alkylene groups which may be linear, cyclic, or branched having from 1 to 10 carbon atoms, partially fluorinated alkylene groups having from 1 to 10 carbon atoms, and derivatives thereof wherein one or more carbon atoms are replaced by catenated nitrogen or oxygen heteroatoms, wherein each $R_f$ contains at most one hydrogen atom, wherein each Y may be the same or different and Y represents H, F, or an $R_fCH_2OCH_2$— group, and wherein the total number of carbon atoms in the molecule is at least 6.

In another aspect, a method for transferring heat is provided that includes providing a device and using a heat-transfer fluid to transfer heat to or from the device, wherein the heat-transfer fluid comprises a compound represented by the following structure:

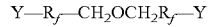

Y—$R_f$—$CH_2OCH_2R_f$—Y wherein each $R_f$ may be the same or different and is, independently, selected from the group consisting of perfluorinated alkylene groups which may be linear, cyclic, or branched having from 1 to 10 carbon atoms; partially fluorinated alkylene groups having from 1 to 10 carbon atoms; and derivatives thereof wherein one or more carbon atoms are replaced by catenated nitrogen or oxygen heteroatoms, wherein each $R_f$ contains at most one hydrogen atom, wherein each Y may be the same or different and Y represents H, F, or an $R_fCH_2OCH_2$— group, and wherein the total number of carbon atoms in the molecule is at least 6.

As used herein:

"alkyl group" refers to a monovalent non-aromatic hydrocarbyl group that may be linear, branched, cyclic, or any combination thereof;

"catenated heteroatom" refers to a nitrogen atom or an oxygen atom that is bonded to carbon atoms in a carbon chain or cyclic compound so as to form a carbon-heteroatom-carbon chain;

"F" represents a fluorine atom;

"partially fluorinated alkylene" means that at least one H atom of the alkyl group has been replaced by fluorine;

"H" represents a hydrogen atom;

"nonaflate" refers to perfluoro-n-butanesulfonate; "perfluorinated" means that all H atoms that are bonded to carbon are replaced by F atoms;

"triflate" refers to trifluoromethanesulfonate;

"polar aprotic solvent" refers to a solvent that is substantially free of —OH and —NH— groups (i.e., does not contain —OH and —NH— groups in more than adventitious amounts); and "Y" represents variable chemical groups.

The provided apparatus and methods include heat-transfer fluids that have higher specific heat capacities than those currently in use. The provided apparatuses include heat-transfer fluids that have high dielectric strength, low electrical conductivity, have chemical inertness, thermal stability and effective heat transfer. They are liquids over a wide range of temperatures and have good heat-transfer properties over a wide range of temperatures.

The above summary is not intended to describe each disclosed embodiment of every implementation of the present invention. The detailed description which follows more particularly exemplifies illustrative embodiments.

DETAILED DESCRIPTION

In the following description it is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

An apparatus requiring heat transfer is provided that includes a device and a mechanism for transferring heat to or from the device. The mechanism includes a heat transfer fluid. The provided heat transfer fluid can include a hydrofluoroether compound as disclosed below. Also included is a method or process of transferring heat that includes a device and a mechanism for transferring heat to or from the device that includes a provided heat transfer fluid.

In the semiconductor industry, there are numerous devices or processes that require a heat-transfer fluid having select properties. The heat-transfer fluid may be used to remove heat, add heat, or maintain a temperature. Each of the semiconductor processes described below incorporates a device or a work-piece which has heat removed from it or has heat added to it. The heat transfer associated with either the heat removal or addition can take place over a wide temperature range. Thus, in each case a heat-transfer fluid is typically used that has other attributes that make it "operator friendly". In order for a heat-transfer fluid to be considered "operator friendly", the heat-transfer fluid can exhibit low toxicity and low flammability.

In one embodiment, the devices can include equipment that is used to test the performance of semiconductor dice. The dice are the individual "chips" that are cut from a wafer of semiconductor substrate. The dice come from the semiconductor foundry and must be checked to ensure they meet functionality requirements and processor speed requirements. The test is used to sort "known good dice" (KGD) from dice that do not meet the performance requirements. This testing is generally performed at temperatures ranging from about −80° C. to about 100° C.

In some cases, the dice are tested one-by-one, and an individual die is held in a chuck. This chuck provides, as part of its design, provision for cooling the die. In other cases, several dice are held in the chuck and are tested either sequentially or in parallel. In this situation, the chuck provides cooling for several dice during the test procedure. It may be advantageous to test dice at elevated temperatures to determine their performance characteristics under conditions of elevated temperature. In this case, a heat-transfer fluid which has good cooling properties well above room temperature is advantageous. In some cases, the dice are tested at very low temperatures. For example, complementary metal-oxide semiconductor ("CMOS") devices in particular operate more quickly at lower temperatures. If a piece of automated testing equipment (ATE) employs CMOS devices "on board" as part of its permanent logic hardware, it may be advantageous to maintain the logic hardware at a low temperature.

Therefore, to provide maximum versatility to the ATE, a heat-transfer fluid typically performs well at both low and high temperatures (i.e., typically has good heat transfer properties over a wide temperature range), is inert (i.e., is non-flammable, low in toxicity, non-chemically reactive), has high dielectric strength, has a low environmental impact, and has predictable heat-transfer properties over the entire operating temperature range.

In another embodiment, the devices can include etchers. Etchers can operate over temperatures ranging from about 70° C. to about 150° C. Typically, during etching, a reactive plasma is used to anisotropically etch features into a semiconductor. The semiconductor can include a silicon wafer or include a II-VI or a III-V semiconductor. In some embodiments, the semiconductor materials can include, for example, III-V semiconductor materials such as, for example, GaAs, InP, AlGaAs, GaInAsP, or GaInNAs. In other embodiments, the provided process is useful for etching II-VI semiconductor materials such as, for example, materials that can include cadmium, magnesium, zinc, selenium, tellurium, and combinations thereof. An exemplary II-VI semiconductor material can include CdMgZnSe alloy. Other II-VI semiconductor materials such as CdZnSe, ZnSSe, ZnMgSSe, ZnSe, ZnTe, ZnSeTe, HgCdSe, and HgCdTe can also be etched using the provided process. The semiconductors to be processed are typically kept at a constant temperature. Therefore, the heat-transfer fluid that can have a single phase over the entire temperature range is typically used. Additionally, the heat-transfer fluid typically has predictable performance over the entire range so that the temperature can be precisely maintained.

In other embodiments, the devices can include ashers that operate over temperatures ranging from about 40° C. to about 150° C. Ashers are devices that can remove the photosensitive organic masks made of positive or negative photoresists. These masks are used during etching to provide a pattern on the etched semiconductor.

In some embodiments, the devices can include steppers that can operate over temperatures ranging from about 40° C. to about 80° C. Steppers are an essential part of photolithography that is used in semiconductor manufacturing where reticules needed for manufacturing are produced. Reticules are tools that contain a pattern image that needs to be stepped and repeated using a stepper in order to expose the entire wafer or mask. Reticules are used to produce the patterns of light and shadow needed to expose the photosensitive mask. The film used in the steppers is typically maintained within a temperature window of +/−0.2° C. to maintain good performance of the finished reticule.

In yet other embodiments, the devices can include plasma enhanced chemical vapor deposition (PECVD) chambers that can operate over temperatures ranging from about 50° C. to about 150° C. In the process of PECVD, films of silicon oxide, silicon nitride, and silicon carbide can be grown on a wafer by the chemical reaction initiated in a reagent gas mixture containing silicon and either: 1) oxygen; 2) nitrogen; or 3) carbon. The chuck on which the wafer rests is kept at a uniform, constant temperature at each selected temperature.

In yet other embodiments, the devices can include electronic devices, such as processors, including microprocessors. As these electronic devices become more powerful, the amount of heat generated per unit time increases. Therefore, the mechanism of heat transfer plays an important role in processor performance. The heat-transfer fluid typically has good heat transfer performance, good electrical compatibility (even if used in "indirect contact" applications such as those employing cold plates), as well as low toxicity, low (or non-) flammability and low environmental impact. Good electrical compatibility requires the heat-transfer fluid candidate to exhibit high dielectric strength, high volume resistivity, and poor solvency for polar materials. Additionally, the heat-transfer fluid must exhibit good mechanical compatibility, that is, it must not affect typical materials of construction in an adverse manner.

The provided device is defined herein as a component, work-piece, assembly, etc. to be cooled, heated or maintained at a selected temperature. Such devices include electrical components, mechanical components and optical components. Examples of devices of the present invention include, but are not limited to microprocessors, wafers used to manufacture semiconductor devices, power control semiconductors, electrical distribution switch gear, power transformers, circuit boards, multi-chip modules, packaged and unpackaged semiconductor devices, chemical reactors, nuclear reactors, fuel cells, and lasers.

The provided apparatus includes a mechanism for transferring heat. Heat is transferred by placing the heat transfer mechanism in thermal contact with the device. The heat transfer mechanism, when placed in thermal contact with the device, removes heat from the device or provides heat to the device, or maintains the device at a selected temperature. The direction of heat flow (from device or to device) is determined by the relative temperature difference between the device and the heat transfer mechanism.

The provided apparatus can also include refrigeration systems, cooling systems, testing equipment and machining equipment. In some embodiments, the provided apparatus can be a constant temperature bath or a thermal shock test bath.

The heat transfer mechanism includes a provided heat-transfer fluid. Additionally, the heat transfer mechanism may include facilities for managing the heat-transfer fluid, including, but not limited to: pumps, valves, fluid containment systems, pressure control systems, condensers, heat exchangers, heat sources, heat sinks, refrigeration systems, active temperature control systems, and passive temperature control systems. Examples of suitable heat transfer mechanisms include, but are not limited to, temperature controlled wafer chucks in PECVD tools, temperature-controlled test heads for die performance testing, temperature controlled work zones within semiconductor process equipment, thermal shock test bath liquid reservoirs, and constant temperature baths. Constant temperature baths are typically operated over a broad temperature range. Therefore, desirable heat-transfer fluids preferably have a wide liquid range and good low-temperature heat transfer characteristics. A heat-transfer fluid having such properties allows a very wide operating range for the constant temperature bath. Typically, most testing fluids require fluid change-out for wide temperature extremes. Also, good temperature control is essential for accurately predicting physical properties of the heat-transfer fluids.

Materials currently used as heat-transfer fluids for cooling electronics or electrical equipment include PFCs, PFPEs, silicone oils, and hydrocarbon oils. Each of these heat-transfer fluids has some disadvantage. PFCs and PFPEs may be environmentally persistent. Silicone oils and hydrocarbon oils are typically flammable.

The provided apparatus includes a device and a mechanism for transferring heat to or from the device that includes a heat-transfer fluid. The heat-transfer fluid includes a compound that is represented by the following structure:

$$Y-R_f-CH_2OCH_2R_f-Y$$

wherein each $R_f$ may be the same or different and can, independently, be selected from the group consisting of perfluorinated alkylene groups which may be linear, cyclic, or branched having from 1 to 10 carbon atoms, partially fluorinated alkylene groups having from 1 to 10 carbon atoms, and derivatives thereof wherein one or more carbon atoms are replaced by catenated nitrogen or oxygen heteroatoms, wherein each $R_f$ contains at most one hydrogen atom, each Y may be the same or different and wherein Y represents H, F, or an $R_fCH_2OCH_2$— group, and wherein the total number of carbon atoms in the molecule is at least 6. Representative heat-transfer fluids are disclosed, for example, in Applicants' copending application, U.S. Ser. No. 12/263,661 (Flynn et al.), filed Nov. 3, 2008.

Methods of making fluorinated ethers that can be useful as components of heat-transfer fluids of the provided apparatuses and methods are carried out in polar aprotic solvents. Many such solvents are known and used in the chemical arts. Examples include tetrahydrofuran (THF), acetone, dimethyl sulfoxide (DMSO), hexamethylphosphoramide (HMPA), N,N-dimethylacetamide (DMA), diethylene glycol dimethyl ether, and N,N-dimethylformamide. The polar aprotic solvent may contain minor amounts of nonpolar aprotic compounds, provided sufficient polarity of the mixed solvent is retained. In some embodiments acetone is specifically desirable.

A first method involves mixing a fluorinated alcohol with a fluorinated sulfonate ester, and base in the polar aprotic solvent under conditions such that a fluorinated ether is formed. The fluorinated alcohol may be represented by the formula

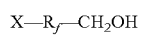

$$X-R_f-CH_2OH$$

wherein:

$R_f$ is selected from the group consisting of perfluorinated alkylene groups which may be linear, cyclic, or branched having from 1 to 10 carbon atoms and partially fluorinated alkylene groups having from 1 to 10 carbon atoms, and derivatives thereof wherein one or more carbon atoms are replaced by catenated nitrogen or oxygen heteroatoms, wherein $R_f$ contains at most one hydrogen atom, and X represents H, F, or an $R_f$—$CH_2OCH_2$— group.

Exemplary divalent groups $R_f$ include: perfluorinated alkylene groups such as, for example, perfluoromethylene, perfluoroethylene (i.e., perfluoroethane-1,2-diyl), perfluoropropane-1,3-diyl, perfluoropropane-1,2-diyl, perfluoro(2-methylpropane-1,3-diyl), 1,1,2,2,3,3,4,4-octafluorobutane-1,4-diyl, perfluoropentane-1,5-diyl, perfluorohexane-1,6-diyl, perfluorocyclohexane-1,4-diyl, and perfluorooctane-1,8-diyl; and partially fluorinated alkyl groups such as, for example, fluoromethylene and 1,1,2,3,3-pentafluoropropane-1,3-diyl. Exemplary derivatives of perfluorinated and partially fluorinated alkyl groups include fluorinated alkoxyalkyl groups such as —$CF_2CF_2OCF_2CF_2$—, —$CF_2CF_2CF_2OCF_2CF_2$—, —$CF_2OCF_2CF_2$—; —$CF_2CF_2CF_2OCF(CF_3)$—; —$CF_2CF_2CF_2OCF(CF_3)$ $CF_2OCF(CF_3)$—; —$CF_2OC_3F_6OCF(CF_3)$—; —$CF_2CF_2CF_2CF_2OCF(CF_3)$—, —$CF_2OC_3F_6$—, —$CF_2OC_3F_6$—, —$CF_2CF_2CF_2OCFHCF_2$—, —$CF_2CF_2CF_2OCF(CF_3)CF_2OCFHCF_2$—,
—$CF_2OC_3F_6OCFHCF_2$—, —$CF_2O(CF_2CF_2O)_xCF_2$—
(wherein x is an integer greater than or equal to 1),
—$CF_2CF_2N(CF_2CF_3)CF_2CF_2$—, —$CF_2(CF_3)NC_2F_4$—,
—$C_3F_6(C_3F_7)NC_2F_4$—, and —$CF_2CF_2CF_2N(CF_3)CF_2$—.
X represents H, F, or an $HOCH_2$— group. In some embodiments, the fluorinated alcohol may be multifunctional, which results in a corresponding polyether. Examples of multifunctional fluorinated alcohols include $HOCH_2C_2F_4CH_2OH$, $HOCH_2C_3F_6CH_2OH$, $HOCH_2C_4F_8CH_2OH$, $HOCH_2(CF_2CF_2O)_nCH_2OH$ wherein n is a positive integer, and $HOCH_2CF_2O(C_2F_4O)_j(CF_2O)_kCF_2CH_2OH$ wherein j and k represent integers in a range of from 1 to 50. In such cases X represents $HOCH_2$—.

The fluorinated sulfonate ester is represented by the formula $R_fCH_2OS(=O)_2R_f^1$ wherein $R_f$ is selected from the group consisting of perfluorinated alkylene groups which may be linear, cyclic, or branched having from 1 to 10 carbon atoms, partially fluorinated alkylene groups having from 1 to 10 carbon atoms, and derivatives thereof wherein one or more carbon atoms are replaced by catenated nitrogen or oxygen heteroatoms, wherein each $R_f$ contains at most one hydrogen atom and $R_f^1$ is a perfluorinated alkylene group having 1-4 carbon atoms with $CF_3$ or $C_4F_9$ being especially preferred.

Exemplary $R_f$ groups include perfluoromethyl, perfluoroethyl, perfluoropropyl, perfluoroisopropyl, perfluorobutyl, perfluoroisobutyl, perfluoropentyl, perfluorohexyl, perfluorocyclohexyl, and perfluorooctyl; and partially fluorinated alkyl groups such as, for example, 1,1,2,2-tetrafluoroethyl, 1,1,2,3,3,3-hexafluoropropyl, and 1,1,2,2,3,3,4,4-octafluorobutyl, and derivatives of perfluorinated and partially fluorinated alkyl groups such as $HCF_2CF_2OCF_2CF_2$—, $CF_3CF_2OCF_2CF_2$—, $HCF_2CF_2CF_2OCF_2CF_2$—, $CF_3CF_2CF_2OCF_2$—, $CF_3OCF_2CF_2$—; $C_3F_7OCF(CF_3)$—; $C_3F_7OCF(CF_3)CF_2OCF(CF_3)$—; $CF_3OC_3F_6OCF(CF_3)$—; $C_4F_9OCF(CF_3)$—, $CF_3OC_3F_6$—, $C_3F_7OCFHCF_2$—, $C_3F_7OCF(CF_3)CF_2OCFHCF_2$—, $CF_3OC_3F_6OCFHCF_2$—, $CF_3O(CF_2CF_2O)_yCF_2$— (wherein y is an integer greater than or equal to 1), $CF_3CF_2N(CF_2CF_3)CF_2CF_2$—, $(CF_3)_2NC_2F_4$—, $(C_3F_7)_2NC_2F_4$—, and $CF_3CF_2CF_2N(CF_3)CF_2$—.

Typically, the fluorinated alcohol and the fluorinated sulfonate ester are combined in approximately the same equivalent amounts (a 1:1 equivalent ratio), although other ratios may be used; for example, a molar ratio in a range of from 0.8 to 1.2. Useful bases include organic and inorganic bases. Exemplary bases include alkali metal carbonates (optionally in combination with a tetraalkylammonium halide), tertiary amines, sodium hydride, and combinations thereof.

The combined components are placed in a pressure vessel under conditions that cause reaction of the components and formation of the corresponding fluorinated ether, although in some cases the reactions can be carried out in glass vessels at ambient pressure. Typical conditions include stirring and heating, although in some cases one or neither may be desirable. After sufficient time has elapsed the mixture is typically returned to ambient temperature (if heated), then the fluorinated ether is obtained by workup and purification; for example, as described in the Preparatory Examples.

In a second method, useful for preparing symmetrical fluorinated ethers according to the present disclosure, the fluorinated alcohol (that is, a partially fluorinated alcohol) as described above is combined with a perfluoroalkanesulfonyl fluoride having from 1 to 4 carbon atoms, in a polar aprotic solvent. Typically mild heating is applied to facilitate reaction in a timely manner.

The fluorinated ethers can be used alone or in admixture with each other or with other commonly-used solvents (for example, alcohols, ethers, alkanes, alkenes, perfluorocarbons, perfluorinated tertiary amines, perfluorinated ethers, cycloalkanes, esters, ketones, aromatics, siloxanes, hydrochlorocarbons, hydrofluorocarbons, and mixtures thereof). Such co-solvents can be typically chosen to modify or enhance the properties of a composition for a particular use and can be utilized in ratios (of co-solvent(s) to fluorinated ether(s)) such that the resulting composition has essentially no flash point. If desired, the fluorinated ethers can be used in combination with other compounds that are very similar in properties relative to a particular use (for example, other fluorinated ethers). Minor amounts of optional components can be added to the fluorinated ethers to impart particular desired properties for particular uses. Useful compositions can comprise conventional additives such as, for example, surfactants, coloring agents, stabilizers, anti-oxidants, flame retardants, and mixtures thereof.

Methods are also provided for transferring heat that include providing a device and using a heat transfer fluid to transfer heat to or from the device. The devices are described above as are the provided heat transfer fluids.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all parts, percentages, ratios, etc. in the Examples and the rest of the specification are by weight. In the following examples: the abbreviation "GC" refers to gas chromatography using a flame ionization detector (uncorrected for response factors); "IR" refers to infrared spectroscopy, "GC/MS" refers to gas chromatography-mass spectroscopy; "NMR" (e.g., $^1H$, $^{19}F$, $^{13}C$) refers to nuclear magnetic resonance spectroscopy; "mL" refers to milliliters, "mol" refers to moles; and "g" refers to grams.

Specific Heat Capacity (Cp) was measured using a Perkin Elmer Pyris 1 DSC (differential scanning calorimeter, DSC), Analytical Instrument No. 294. The samples were weighed using a Perkin Elmer microbalance, Analytical Instrument No. 289. The "three-curve" method was used, in which scans were acquired for the empty DSC pan, a sapphire heat capacity reference disk, and the sample material. The Perkin Elmer thermal analysis software calculates heat capacity, calibrated against the known heat capacity of the sapphire reference. Heat capacity data were taken starting at −20° C. in 20° C. increments, reporting one heat capacity value in the middle of each 20° C. heating range in order to avoid transient data at the beginning and end of each heating range.

Preparatory Example A

Preparation of 2,2,3,4,4,4-hexafluorobutyl 1,1,2,2,3,3,4,4,4-nonafluorobutane-1-sulfonate 2,2,3,4,4,4-hexafluorobutan-1-ol (202 g, 1.1 mol, obtained from Sinochem Corp., Beijing, China), 1,1,2,2,3,3,4,4,4-nonafluorobutane-1-sulfonyl fluoride (332 g, 1.1 mol, obtained from 3M Company of Saint Paul, Minn.) and water (300 g) were combined in a 3-L, 3-necked round bottom flask. The flask was equipped with a magnetic stirrer, cold water condenser, thermocouple and a 250-mL addition funnel. Aqueous potassium hydroxide (149.3 g, 45 weight percent, 1.22 equivalents) was added dropwise via an addition funnel at such a rate that the temperature did not exceed 35° C. Once the addition of the base was complete the mixture was stirred for 16 hours at room temperature. The precipitated salts were then filtered from the mixture and the lower liquid fluorochemical product phase was separated from the upper aqueous phase. Unreacted 2,2,3,4,4,4-hexafluorobutan-1-ol and 1,1,2,2,3,3,4,4,4-nonafluorobutane-1-sulfonyl fluoride were removed by atmospheric distillation.

Preparatory Example B

Preparation of 2,2,3,3-tetrafluoropropyl 1,1,2,2,3,3,4,4,4-nonafluorobutane-1-sulfonate 2,2,3,3-tetrafluoropropan-1-ol (202 g, 1.52 mol, obtained from Sinochem Corp.), 1,1,2,2,3,3,4,4,4-nonafluorobutane-1-sulfonyl fluoride (465 g, 1.52 mol, obtained from 3M Company) and water (500 g) were combined in a 3-liter, 3-necked round bottom flask. The flask was equipped with a magnetic stirrer, cold water condenser, thermocouple and an addition funnel. Aqueous potassium hydroxide (45 percent by weight, 211.5 g, 1.7 mol, obtained from Aldrich Chemical Co., Milwaukee, Wis.) was added dropwise via the addition funnel at such a rate that the temperature did not exceed 35° C. Once the addition of the potassium hydroxide was complete, the mixture was stirred for 16 hours at room temperature. Precipitated salts were then filtered from the mixture and the lower liquid fluorochemical product phase was separated from the upper aqueous phase. Unreacted 2,2,3,3-tetrafluoropropan-1-ol and 1,1,2,2,3,3,4,4,4-nonafluorobutane-1-sulfonyl fluoride were removed from the liquid fluorochemical product phase by atmospheric distillation.

Preparatory Example C

Preparation of 2,2,3,3,4,4,4-heptafluorobutyl 1,1,2,2,3,3,4,4,4-nonafluorobutane-1-sulfonate 2,2,3,3,4,4,4-heptafluorobutan-1-ol (200 g, 1.0 mol, obtained from 3M Company) and 1,1,2,2,3,3,4,4,4-nonafluorobutane-1-sulfonyl fluoride (300 g, 1.0 mol, obtained from 3M Company) were combined in a 1-liter, 3-necked round bottom flask. The flask was equipped with an overhead mechanical stirrer, cold water condenser, thermocouple and an addition funnel. Aqueous potassium hydroxide (45 percent by weight in water, 154 g, 1.05 mol) was added dropwise via the addition funnel at such a rate that the temperature did not exceed 35° C. Once the addition of the potassium hydroxide was complete, the mixture was stirred for 16 hours at room temperature. Precipitated salts were then filtered from the mixture and the lower liquid fluorochemical product phase was separated from the upper aqueous phase and washed once with water to give 350 g crude product. The product was distilled at atmospheric pressure and the distillation cut boiling from 140-150° C. used without further purification (96.3 percent purity by GC).

Preparatory Example D

Preparation of 2,2,3,3-tetrafluoropropyl trifluoromethanesulfonate 2,2,3,3-tetrafluoropropan-1-ol (244.3 g, 1.85 mol, obtained from Sinochem Corp.), triethylamine (187.2 g, 1.85 mol, obtained from Aldrich Chemical Co.) and 500 mL of chloroform were combined in a 2-liter Parr pressure reactor and sealed. The reactor temperature was set to −10° C. Trifluoromethanesulfonyl fluoride (281.33 g, 1.85 mol, obtained from 3M Company) was added at such a rate that the temperature did not exceed −5° C. Once the addition was complete, the mix was held at −10° C. for 45 minutes. The reaction mix was then emptied and washed with 2×500 mL portions of water and 1×250 mL portion of 1N HCl. GC analysis of the reaction mixture indicated a 97 percent conversion to the product. The chloroform solvent was removed by rotary evaporation. The product was dried over anhydrous magnesium sulfate which was then filtered from the product.

Preparatory Example 1

Preparation of 4-(2',2',3',4',4',4'-hexafluorobutoxy)-1,1,1,2,3,3-hexafluorobutane, $CF_3CFHCF_2CH_2OCH_2CF_2CFHCF_3$ 2,2,3,4,4,4-hexafluorobutan-1-ol (61.3 g, 0.337 mol, obtained from Sinochem Corp.), 2,2,3,4,4,4-hexafluorobutyl 1,1,2,2,3,3,4,4,4-nonafluorobutane-1-sulfonate (156.4 g, 0.337 mol), potassium carbonate (46.5 g, 0.337 mol), tri-n-butylamine (0.75 g, 0.004 mol) and 150 mL of acetone were combined in a 600-mL Parr pressure reactor. The mix was heated to 75° C. with vigorous stirring for 18 hours. The mix was then emptied and the solids were filtered from the product. The liquid product was washed twice with 100 mL portions of water. Alkylation yield based on GC analysis (uncorrected for response factors) was 60 percent. A clear phase resulted that was then purified by fractional distillation using a concentric tube column resulting in 4-(2,2,3,4,4,4-hexafluorobutoxy)-1,1,1,2,3,3-hexafluorobutane, boiling point=150° C. Purity of this distilled fraction was 98 percent based on GC analysis (uncorrected for response factors). GC/MS analysis was consistent with the assigned structure. The specific heat capacity was determined for this compound by the method described above and is shown with other examples in Table 1.

Preparatory Example 2

Preparation of 5-(2',2',3',4',4',4'-hexafluorobutoxy)-1,1,2,2,3,3,4,4-octafluoropentane, $H(CF_2CF_2)_2CH_2OCH_2CF_2CFHCF_3$ 2,2,3,3,4,4,5,5-octafluoropentan-1-ol (78.2 g, 0.337 mol, obtained from Sinochem Corp.), 2,2,3,4,4,4-hexafluorobutyl 1,1,2,2,3,3,4,4,4-nonafluorobutane-1-sulfonate (156.4 g, 0.337 mol), potassium carbonate (46.5 g, 0.337 mol), tri-n-butylamine (0.75 g, 0.004 mol) and 150 mL acetone were combined in a 600 mL Parr pressure reactor. The mix was heated to 75° C. with stirring for 18 hours. The salts were filtered from the product. The product was washed with 2×100 mL portions of water to remove extra salts. A resultant fluorochemical product phase was separated and dried over anhydrous magnesium sulfate. 5-(2,2,3,4,4,4-Hexafluorobutoxy)-1,1,2,2,3,3,4,4-octafluoropentane was then obtained by fractional distillation using a concentric tube column. The main fraction boiled between 176-178° C., and GC/MS analysis was consistent with the assigned structure. The specific heat capacity was determined for this compound by the method described above and is shown with other examples in Table 1.

Preparatory Example 3

Preparation of 5-(2',2',3',3'-tetrafluoropropoxy)-1,1,2,2,3,3,4,4-octafluoropentane, $H(CF_2CF_2)_2CH_2OCH_2CF_2CF_2H$ 2,2,3,3,4,4,5,5-octafluoropentan-1-ol (424 g, 1.83 mol, obtained from Sinochem Corp.), 2,2,3,3-tetrafluoropropyl 1,1,2,2,3,3,4,4,4-nonafluorobutane-1-sulfonate (760 g, 1.83 mol), potassium carbonate (252 g, 1.83 mol), tetra-n-butylammonium bromide (20 g, 0.06 mol) and 400 g of acetone were combined in a 2-liter Parr pressure reactor. The temperature was set to 75° C. and the mix was stirred for 72 hours. The mix was then emptied and the salts were filtered from the product solution. The product solution was washed twice with 200 mL portions of water to remove additional salts. The lower fluorochemical phase was then dried over anhydrous magnesium sulfate, filtered and then purified by fractionation using a 20-plate Oldershaw distillation column. The main fraction (approximately 98 percent purity as measured by GC, uncorrected for response factors) boiled at a temperature of 170° C. at atmospheric pressure. The structure was consistent with analysis by GC/MS, $^{19}F$ NMR, and $^{1}H$ NMR. The specific heat capacity was determined for this compound by the method described above and is shown with other examples in Table 1.

Preparatory Example 4

Preparation of 1,1,2,2,3,3,4,4-octafluoro-5-(2',2',3', 3',4',4',5',5'-octafluoropentyloxy)pentane, $HCF_2CF_2CF_2CF_2CH_2OCH_2CF_2CF_2CF_2H$ 2,2,3,3,4,4,5,5-octafluoropentan-1-ol (22.1 g, 0.097 mol) was added dropwise at 50° C. to a suspension of sodium hydride (2.5 g of 95 percent purity, 0.097 mol) in anhydrous diethylene glycol dimethyl ether (200 g) over a two hour period. At the end of this time, the solution was homogeneous. To this solution was then added $HCF_2CF_2CF_2CF_2CH_2OS(=O)_2CH_2CF_2CF_2CF_2CF_3$ (50 g, 0.097 mol) prepared by reaction of $HCF_2CF_2CF_2CF_2CH_2OH$ with $CF_3CF_2CF_2CF_2SO_2F$ with triethylamine at 0° C. The reaction mixture was then heated to 9° C. for 16 hours and 105° C. for an additional six hours. After the reaction was complete, water (100 milliliters) was added, and the mixture distilled using a Dean-Stark trap to return the water and organic solvent back to the distillation vessel while allowing separation of the lower fluorochemical phase in the trap. A preliminary purification was carried out by distillation of the 30.1 g obtained through a concentric tube distillation column. The distillate (204-207° C.) was found to consist of two main components in a 75/21 mixture (as determined by gas chromatography (GC) uncorrected for response factors)), which were $HCF_2CF_2CF_2CF_2CH_2OS(=O)_2CF_2CF_2CF_2CF_3$ and $HCF_2CF_2CF_2CF_2CH_2OCH_2CF_2CF_2CF_2H$.

Purification of the ether was effected by treatment of the nonaflate-contaminated mixture with a solution of lithium chloride (25 g) in dimethylformamide (200 mL) at 50° C. Under these specific conditions, the nonaflate was found to react rapidly with the lithium chloride to give $HCF_2CF_2CF_2CF_2CH_2Cl$ and lithium nonaflate. The reaction mixture was poured into water, the lower fluorochemical phase separated and washed twice more with water and the resulting mixture distilled (boiling point: 205° C., 70° C./2 at mm Hg) to give a purity of 91.5 percent as measured by GC, uncorrected for response factors. The assigned structure was consistent with the GC/MS analysis, infrared spectroscopy, $^{19}F$ NMR, $^{1}H$ NMR, and $^{13}C$ NMR. The specific heat capacity was determined for this compound by the method described above and is shown with other examples in Table 1.

Preparatory Example 5

Preparation of 1-(3'-(2",2",3",3"-tetrafluoropropoxy)-1',2',2'-trifluoropropoxy)-1,1,2,2,3,3,3-heptafluoropropane
$CF_3CF_2CF_2OCFHCF_2CH_2OCH_2CF_2CF_2H$ 2,2,3-trifluoro-3-(perfluoropropoxy)propanol (71.6 g, 0.24 mol, prepared as described in U.S. Pat. App. Publ. No. 2007/0051916 A1 (Flynn et al.), Example 1), 2,2,3,3-tetrafluoropropyl 1,1,2,2,3,3,4,4,4-nonafluorobutane-1-sulfonate (119.23 g, 0.288 mol), potassium carbonate (39.7 g, 0.288 mol), tri-n-butylamine (0.75 g, 0.004 mol) and 150 mL of acetone were combined in a 600-mL Parr pressure reactor. The temperature of the reactor was set to 75° C. and the mix was stirred for 24 hours. The mix was then emptied and the salts were filtered from the product solution. The product solution was washed twice with 100 mL portions of water to remove additional salts. The lower phase was then dried over anhydrous magnesium sulfate, filtered and then purified by fractional distillation using a concentric tube column. The main fraction (94 percent purity by GC, uncorrected for response factors) boiled at a temperature of 161-162° C. at atmospheric pressure. The assigned structure was consistent with the GC/MS analysis.

Preparatory Example 6

Preparation of 3-(2,2,3,3-tetrafluoropropoxy)-1,1,2, 2-tetrafluoropropane, $HCF_2CF_2CH_2OCH_2CF_2CF_2H$ 2,2,3,3-tetrafluoropropan-1-ol (50 g, 0.38 mol), 2,2,3,3-tetrafluoropropyl 1,1,2,2,3,3,4,4,4-nonafluorobutane-1-sulfonate (157 g, 0.38 mol), potassium carbonate (52.3 g, 0.38 mol and 197 g of acetone (solvent) were combined in a 600-mL Parr pressure reactor. After degassing, the reactor was sealed and the mixture was heated to 75° C. with vigorous stirring for 18 hours. After cooling, the reactor was opened and the contents filtered to remove the insoluble salts. The acetone was removed by rotary evaporation. To this residue was then added an excess of water and the product azeotropically distilled using a Dean Stark trap to give after phase separation and water washing 52.7 g crude product. Some of the product ether distilled with the solvent during the rotary evaporation so the distillate was poured into water and the lower fluorochemical phase separated and washed once with water (17.8 g). The yield at this stage based on the combined fluorochemical phases by GC analysis was 52 percent. The product was distilled at atmospheric pressure and the distillation cut from 112-152° C. subsequently treated with LiCl (20 g) in N,N-dimethylformamide (150 mL) at 50° C. as described in Preparatory Example 4 to remove the residual 2,2,3,3-tetrafluoropropyl 1,1,2,2,3,3,4,4,4-nonafluorobutane-1-sulfonate. The product was then distilled through the concentric tube column to give the product ether, boiling point=134-135° C. in 98.6 percent purity. The structure was consistent with the GC/MS, IR, $^{19}F$ NMR, $^{1}H$ NMR, and $^{13}C$ NMR. The specific heat capacity was determined for this compound by the method described above and is shown with other examples in Table 1.

Preparatory Example 7

Preparation of 5-(2,2,2-trifluoroethoxy)-1,1,2,2,3,3, 4,4-octafluoropentane; $H(CF_2CF_2)_2CH_2OCH_2CF_3$ 2,2,3,3,4,4,5,5-octafluoropentan-1-ol (50 g, 0.215 mol), 2,2,2-trifluoroethyl trifluoromethanesulfonate (50 g, 0.215 mol, obtained from Synquest Labs, Inc., Alachua, Fla.), potassium carbonate (29.7 g, 0.215 mol) and 175 g of acetone (solvent) were combined in a 600-mL Parr pressure reactor. After degassing, the reactor was sealed and the mixture was heated to 75° C. with vigorous stirring for 16 hours. After cooling, the reactor was opened and the contents filtered to remove the insoluble salts. The acetone was removed by rotary evaporation. To this residue was then added an excess of water and the product azeotropically distilled using a Dean Stark trap to give after phase separation and water washing 60.4 g crude product. The yield at this stage by GC analysis was 50 percent. The product was distilled at atmospheric pressure and the distillation cuts greater than 138° C. were combined with the pot and subsequently treated with LiCl (15 g) in N,N-dimethylformamide (250 mL) at 50° C. as described in Preparatory Example 4 to remove the residual 2,2,2-trifluoroethyl trifluoromethanesulfonate. The product was then distilled through the concentric tube column to give the product ether, boiling point=138-143° C. in 95.9 percent purity. The structure was consistent with GC/MS and $^1$H NMR analysis. The specific heat capacity was determined for this compound by the method described above and is shown with other examples in Table 1.

Preparatory Example 8

Preparation of 4-(2,2,3,3,4,4,4-heptafluorobutoxy)-1, 1,1,2,2,3,3-heptafluorobutane; $C_3F_7CH_2OCH_2C_3F_7$ 2,2,3,3,4,4,4-heptafluorobutan-1-ol (50 g, 0.25 mol, obtained from 3M Company), 2,2,3,3,4,4,4-heptafluorobutyl 1,1,2,2,3,3,4,4,4-nonafluorobutane-1-sulfonate (120.5 g, 0.25 mol, prepared as described above), potassium carbonate (34.5 g, 0.25 mol) and 175 g of acetone (solvent) were combined in a 600-mL Parr pressure reactor. After degassing, the reactor was sealed and the mixture was heated to 75° C. with vigorous stirring for 112 hours. After cooling, the reactor was opened and the contents filtered to remove the insoluble salts. The acetone was removed by rotary evaporation. Some of the product ether distilled with the solvent during the rotary evaporation so the distillate was poured into water and the lower fluorochemical phase separated and added to the rotary evaporation residue. To this residue was then added approximately 250 mL water and the product azeotropically distilled using a Dean-Stark trap to give after phase separation and water washing 62 g crude product. The yield at this stage by GC analysis was 11 percent. The product was treated with LiCl (15 g) in N,N-dimethylformamide (250 mL) at 50° C. as described in Preparatory Example 4 to remove the residual nonafluorobutane-1-sulfonate. The product was then distilled to a purity of 78 percent. GC/MS and $^1$H NMR were consistent with the assigned structure.

Preparatory Example 9

Preparation of $C_3F_7CH_2OCH_2C_2F_4CH_2OCH_2C_3F_7$ 2,2,3,3-tetrafluorobutane-1,4-diol ($HOCH_2C_2F_4CH_2OH$, 20 g, 0.123 mol, obtained from 3M Company), 2,2,3,3,4,4,4-heptafluorobutyl-1,1,2,2,3,3,4,4,4-nonafluorobutane-1-sulfonate ($C_3F_7CH_2OSO_2C_4F_9$, 119 g, 0.247 mol, prepared as described above), potassium carbonate (34.1 g, 0.247 mol) and 245 g of acetone (solvent) were combined in a 600-mL Parr pressure reactor. After degassing, the reactor was sealed and the mixture was heated to 75° C. with vigorous stirring for 112 hours. After cooling, the reactor was opened and the contents filtered to remove the insoluble salts. The acetone was removed by rotary evaporation. To this residue was then added an excess of water, and the product azeotropically distilled using a Dean-Stark trap to give after phase separation and water washing 57.2 g crude product. GC/MS analysis was consistent with the presence of the expected product $C_3F_7CH_2OCH_2C_2F_4CH_2OCH_2C_3F_7$ as a component in a more complex mixture (about 8.4 percent yield by GC).

Preparatory Example 10

Preparation of $(CF_3)_2NC_2F_4CH_2OCH_2C_4F_8H$

3-[bis(trifluoromethyl)amino]-2,2,3,3-tetrafluoro-propan-1-ol (($CF_3)_2NC_2F_4CH_2OH$, 25 g, 0.088 mol, 3M Company, Saint Paul, Minn.), $HCF_2CF_2CF_2CF_2CH_2OS(=O)_2CF_2CF_2CF_2CF_3$ (45.4 g, 0.088 mol) prepared as described in Example 4, potassium carbonate (12.2 g, 0.088 mol) and 175 g of acetone (solvent) were combined in a 600-mL Parr pressure reactor. After degassing, the reactor was sealed and the mixture was heated to 75° C. with vigorous stirring for 64 hours. After cooling, the reactor was opened and the contents filtered to remove the insoluble salts. The acetone was removed by rotary evaporation. To this residue was then added an excess of water and the product azeotropically distilled using a Dean-Stark trap to give after phase separation and water washing 30.3 g crude product. GC/MS analysis was consistent with the presence of the expected product $(CF_3)_2NC_2F_4CH_2OCH_2C_4F_8H$ as a component in a more complex mixture (about 6 percent yield by GC). The mixture was distilled to a purity of about 35 percent of the ether, for which the $^1$H-NMR was consistent with the structure.

Preparatory Example 11

Preparation of 8-(2',2',3',3'-tetrafluoropropoxy)-1,1, 1,2,2,3,3,4,4,5,5,6,6,7,7-pentadecafluorooctane, $C_7F_{15}CH_2OCH_2CF_2CF_2H$ Pentadecafluoro-1-octanol (100 g, 0.25 mol, obtained from Exfluor Corp.), 2,2,3,3-tetrafluoropropyl 1,1,2,2,3,3,4,4,4-nonafluorobutane-1-sulfonate (103.5 g, 0.25 mol), potassium carbonate (34.5 g, 0.25 mol), Adogen 464 (5.5 g, Aldrich, used as a 50% solution in diglyme) and 150 g of acetone were combined in a 600 mL Parr pressure reactor. The reaction mixture was heated to 75° C. and the mixture was stirred for 72 hours. After cooling to room temperature, the reaction mixture was filtered to remove the solids and the acetone removed by rotary evaporation. Water was added to the residue and the mixture azeotropically distilled to yield after one water wash 114.2 g of about 77% purity of the desired ether. The product was fractionally distilled using a concentric tube column with the main fraction of 99.6% purity having a boiling point of 196° C. The specific heat capacity was determined for this compound by the method described above and is shown with other examples in Table 1.

Preparatory Example 12

Preparation of 5-(2',2',3',3',3'-pentafluoropropoxy)-1, 1,2,2,3,3,4,4-octafluorofluoropentane, $HC_4F_8CH_2OCH_2CF_2CF_3$ 2,2,3,3,4,4,5,5-octafluoropentan-1-ol (50 g, 0.21 mol, obtained from Sinochem Corp.), 2,2,3,3,3-pentafluoropropyl 1,1,2,2,3,3,4,4,4-nonafluorobutane-1-sulfonate (93.1 g, 0.21 mol, prepared by the reaction of 2,2,3,3,3-pentafluoropropan-1-ol and nonafluorobutanesulfonyl fluoride in the presence of triethylamine in methyl t-butyl ether solvent at 0° C.), potassium carbonate (29.8 g, 0.21 mol), tetra-n-butylammonium bromide (0.5 g) and 175 g of acetone were combined in a 600 mL Parr pressure reactor. The reactor was sealed and the temperature raised to 75° C. and the mixture was stirred for 16 hours. After cooling to room temperature, the reaction mixture was filtered to remove the solids and the solids were washed once with a small quantity of acetone. The acetone solution was poured into water, the lower fluorochemical phase separated and washed once with water to give 89.5 g of a liquid which was about 24% the desired ether product. The product was purified by distillation using a concentric tube column and the distillate (fractions from 124° C. to 150° C.) treated with LiCl (20.6 g, 0.48 mol) in DMF (250 mL) at 50° C. for about 1 hour to convert the residual butane sulfonate starting material to the lower boiling material $C_2F_5CH_2Cl$. Water was added to the DMF solution and the product azeotropically distilled, washed once with water and purified by distillation in a concentric tube column to give the final ether product in 99.2% purity, boiling point=150° C. The structure was consistent with GC/MS and $^1$H-NMR. The specific heat capacity was determined for this compound by the method described above and is shown with other examples in Table 1.

Preparatory Example 13

Preparation of 4-[1,1-Difluoro-2-(2,2,3,3-tetrafluoropropoxy)-ethyl]-2,2,3,3,5,5,6,6-octafluoromorpholine (I)

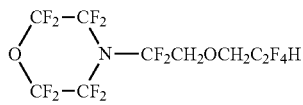

Preparation of 2,2-difluoro-2-(2,2,3,3,5,5,6,6-octafluoromorpholin-4-yl)-ethanol Intermediate Tetraglyme, (400 g.) and sodium borohydride, (20 g, 0.54 mol.) were combined in a 3-liter round bottom glass flask equipped with an overhead stirrer, water cooled condenser, thermocouple and addition funnel. The reaction mixture was kept under nitrogen. The contents were heated to 70° C. and difluoro-(2,2,3,3,5,5,6,6-octafluoromorpholi-4-yl)-acetic acid methyl ester (175 g. 0.516 mol.) made from electrochemical fluorination of 4-(2-hydroxyethyl)morpholine (Aldrich) followed by esterification with methanol was added over 2.5 hours. The mixture was kept at 70° C. for an additional 16 hours. The reaction mixture was cooled to room temperature and methanol (115 ml.) was added over a two hour period. Water (810 ml.) was added followed by dropwise addition of sulfuric acid (69 g. 98%). The reaction mixture was poured into a separatory funnel and the lower fluorochemical phase washed twice with water.

A second lot with the same charges was run and the two lots combined at this stage and distilled under vacuum to provide 2,2-difluoro-2-(2,2,3,3,5,5,6,6-octafluoromorpholin-4-yl)-ethanol (223 g.) with 97.7% purity by GC analysis. Yield based on GC analysis is 67.8%. Structure was confirmed by GC/MS.

Preparation of 4-[1,1-Difluoro-2-(2,2,3,3-tetrafluoropropoxy)-ethyl]-2,2,3,3,5,5,6,6-octafluoro-morpholine 2,2-difluoro-2-(2,2,3,3,5,5,6,6-octafluoro-morpholin-4-yl)-ethanol, (100 g, 0.325 mol, prepared as described above), 2,2,3,3-tetrafluoropropyl nonafluorobutanesulfonate (138.6 g, 0.33 mol.), potassium carbonate (44.7 g, 0.32 mol) and 200 ml of acetone (solvent) were combined in a 600-mL Parr pressure reactor. After degassing, the reactor was sealed and the mixture was heated to 75° C. with vigorous stirring for 64 hours. After cooling, the reactor was opened and the contents filtered to remove the insoluble salts. The reaction mixture was poured into water, the lower fluorochemical phase separated and washed three more times with water to provide 120.9 grams of material containing 80.7% of desired ether by gas chromatography. The yield at this stage based on the GC analysis was 71.4 percent. Purification of the ether was effected by treatment of the nonaflate-contaminated mixture with a solution of lithium chloride (0.77 g) in dimethylformamide (about 10 mL) at 50° C. as described in Preparatory Example 4. The reaction mixture was poured into water and steam distilled. The lower phase was washed three times with water, dried over anhydrous magnesium sulfate and fractionally distilled using a concentric tube distillation column. The main fraction (99.1 percent purity as measured by $^{19}$F-NMR) boiled at a temperature of 174.1° C. to 174.4° C. at atmospheric pressure. The specific heat capacity was determined for this compound by the method described above and is shown with other examples in Table 1.

TABLE 1

| | Heat Capacity Data (J/gK) of Examples | | | | |
|---|---|---|---|---|---|
| Example # | Compound | −20° C. | 0° C. | 20° C. | 40° C. |
| CE1 | Novec 7500 (available from 3M Company, St. Paul, MN.) | 1.03 | 1.06 | 1.10 | 1.12 |
| CE2 | FC-43 (available from 3M) | | | 1.04 (25° C.) | |
| CE3 | ZT-180 Heat Transfer Fluid (available from Solvay Solexis S.p.A.) | | | 1.09 (25° C.) | |
| 1 | [CF$_3$CFHCF$_2$CH$_2$O]$_2$ | 1.24 | 1.27 | 1.29 | 1.33 |
| 2 | CF$_3$CFHCF$_2$CH$_2$OCH$_2$C$_4$F$_8$H | 1.11 | 1.15 | 1.16 | 1.20 |
| 3 | HC$_4$F$_8$CH$_2$OCH$_2$C$_2$F$_4$H | 1.19 | 1.22 | 1.23 | 1.26 |
| 4 | [HC$_4$F$_8$CH$_2$]$_2$O | 1.10 | 1.13 | 1.15 | 1.17 |
| 6 | HC$_2$F$_4$CH$_2$OCH$_2$C$_2$F$_4$H | 1.32 | 1.35 | 1.36 | 1.38 |
| 7 | HC$_4$F$_8$CH$_2$OCH$_2$CF$_3$ | 1.09 | 1.12 | 1.14 | 1.16 |
| 11 | C$_7$F$_{15}$CH$_2$OCH$_2$C$_2$F$_4$H | 1.12 | 1.15 | 1.17 | 1.19 |
| 12 | HC$_4$F$_8$CH$_2$OCH$_2$C$_2$F$_5$ | 1.13 | 1.16 | 1.17 | 1.20 |

TABLE 1-continued

Heat Capacity Data (J/gK) of Examples

| Example # | Compound | −20° C. | 0° C. | 20° C. | 40° C. |
|---|---|---|---|---|---|
| 13 | 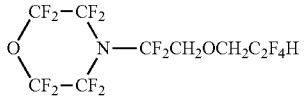 | 1.13 | 1.17 | 1.19 | 1.21 |

CE1-3 are Comparative Examples 1-3

Table 1 shows specific heat capacity data (J/gK) of various exemplary heat transfer fluids measured at −20° C., 0° C., 20° C., and 40° C. Three Comparative Examples are shown. The data for Comparative Examples 2 and 3 were only measured at 25° C. CE1 is Novec 7500, a commercially available heat transfer fluid. FC-43 (CE2) is another commercially available fluid used for heat transfer. Both Novec 7500 and FC-43 are available from 3M Company, St. Paul, Minn. CE-3 is ZT-180, a commercially available heat transfer fluid available from Solvay Solexis S.p.A. The heat capacities show that the provided heat transfer fluids and devices incorporating the same have higher heat capacities—thus are more efficient and useful for heat transfer than comparative materials.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

What is claimed is:

1. An apparatus requiring heat transfer comprising:
   a device; and
   a mechanism for transferring heat to or from the device, comprising using a heat-transfer fluid,
   wherein the heat transfer fluid comprises a compound that is represented by the following structure:

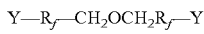
   Y—$R_f$—CH$_2$OCH$_2$$R_f$—Y wherein each $R_f$ may be the same or different and is, independently, selected from the group consisting of perfluorinated alkylene groups which may be linear, cyclic, or branched having from 1 to 10 carbon atoms, partially fluorinated alkylene groups having from 1 to 10 carbon atoms, and derivatives thereof wherein one or more carbon atoms are replaced by catenated nitrogen or oxygen heteroatom, wherein each $R_f$ contains at most one hydrogen atom, wherein each Y may be the same or different and Y represents H, F, or an $R_f$CH$_2$OCH$_2$— group, and wherein the total number of carbon atoms in the molecule is at least 6.

2. An apparatus according to claim 1, wherein at least one $R_f$ comprises a secondary carbon atom having one hydrogen atom and one fluorine atom bonded thereto.

3. An apparatus according to claim 1, wherein at least one $R_f$ comprises from 3 to about 8 carbon atoms.

4. An apparatus according to claim 1, wherein at least one $R_f$ comprises from 3 to about 5 carbon atoms.

5. An apparatus according to claim 1, wherein at least one $R_f$ comprises at least 3 fluorine atoms.

6. An apparatus according to claim 5, wherein at least one $R_f$ comprises at least 4 fluorine atoms.

7. An apparatus according to claim 6, wherein at least one $R_f$ comprises at least 6 fluorine atoms.

8. An apparatus according to claim 1, wherein at least one $R_f$ comprises a perfluorinated alkylene group which may be linear, cyclic, or branched having from 1 to 10 carbon atoms.

9. An apparatus according to claim 1, wherein at least one $R_f$ comprises a partially fluorinated alkylene group having from 1 to 10 carbon atoms.

10. An apparatus according to claim 1, wherein at least one $R_f$ comprises a derivative of a perfluorinated alkylene group or a partially fluorinated alkylene group wherein one or more carbon atoms are replaced by catenated nitrogen or oxygen heteroatoms, wherein each $R_f$ contains most one hydrogen atom,
   wherein Y represents H, F, or an $R_f$CH$_2$OCH$_2$— group, and
   wherein the total number of carbon atoms in the molecule is at least 6.

11. An apparatus according to claim 1, wherein the device is selected from the group consisting of microprocessors, wafers used to manufacture semiconductor devices, power control semiconductors, electrical distribution switch gear, power transformers, circuit boards, multi-chip modules, packaged and unpackaged semiconductor devices, chemical reactors, nuclear reactors, fuel cells, lasers, and missile components.

12. An apparatus according to claim 1, wherein the device is heated.

13. An apparatus according to claim 1, wherein the device is cooled.

14. An apparatus according to claim 1, wherein the device is maintained at a selected temperature.

15. An apparatus according to claim 1, wherein the mechanism for transferring heat is selected from the group consisting of temperature controlled wafer chucks in PECVD tools, temperature controlled test heads for die performance testing, temperature controlled work zones within semiconductor process equipment, thermal shock test bath liquid reservoirs, and constant temperature baths.

16. A method for transferring heat comprising:
   providing a device; and
   using a heat-transfer fluid to transfer heat to or from the device, wherein the heat-transfer fluid comprises a compound represented by the following structure:

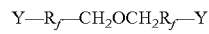
   Y—$R_f$—CH$_2$OCH$_2$$R_f$—Y wherein $R_f$ may be the same or different and is, independently, selected from the group consisting of perfluorinated alkylene groups which may be linear, cyclic, or branched having from 1 to 10 carbon atoms; partially fluorinated alkylene groups having from 1 to 10 carbon atoms; and derivatives thereof wherein one or more carbon atoms are replaced by catenated nitrogen or oxygen heteroatom, wherein each $R_f$ contains most one hydrogen atom, wherein each Y may be the same or different, wherein Y represents H, F, or an $R_f$CH$_2$OCH$_2$— group, and wherein the total number of carbon atoms in the molecule is at least 6.

* * * * *